United States Patent [19]

Honda

[11] Patent Number: 5,742,767
[45] Date of Patent: Apr. 21, 1998

[54] PROGRAM FUNCTION EXTENDING METHOD AND APPARATUS AND DATA PROCESSING METHOD

[75] Inventor: Yasuaki Honda, Chiba, Japan

[73] Assignee: Sony Corporation, Tokyo, Japan

[21] Appl. No.: 604,428

[22] Filed: Feb. 21, 1996

[30] Foreign Application Priority Data

Feb. 23, 1995 [JP] Japan .................................. 7-035153

[51] Int. Cl.$^6$ ...................................................... G06F 9/00
[52] U.S. Cl. .................... 395/200.32; 707/101; 707/102
[58] Field of Search ........................... 395/200.1, 200.12, 395/200.04, 200.32, 390; 364/715.09, 715.11; 707/101, 102

[56] References Cited

U.S. PATENT DOCUMENTS 5,050,071  9/1991  Harris et al. ........................... 395/601

Primary Examiner—James P. Trammell
Assistant Examiner—Thomas Peeso
Attorney, Agent, or Firm—Limbach & Limbach L.L.P.

[57] ABSTRACT

Terminals 2-1 to 2-3 and a host computer 1 have client programs A to D of a basic function for outputting characters representing text data entered thereto to their own display units and transmitting the characters to other apparatuses for displaying them therein. When a new function is added, a client program E providing the new function is newly incorporated in the host computer 1. When text data is entered to, for example, the terminal 2-1, the client program E determines whether or not the entered text data includes specific text data which is defined in advance. If the specific text data is included, processing associated with the specific data is executed and results obtained from the execution are passed to the client program D to be transmitted to the terminals 2-1 to 2-3. In this way, a new function can be added with ease without modifying the basic function.

12 Claims, 15 Drawing Sheets

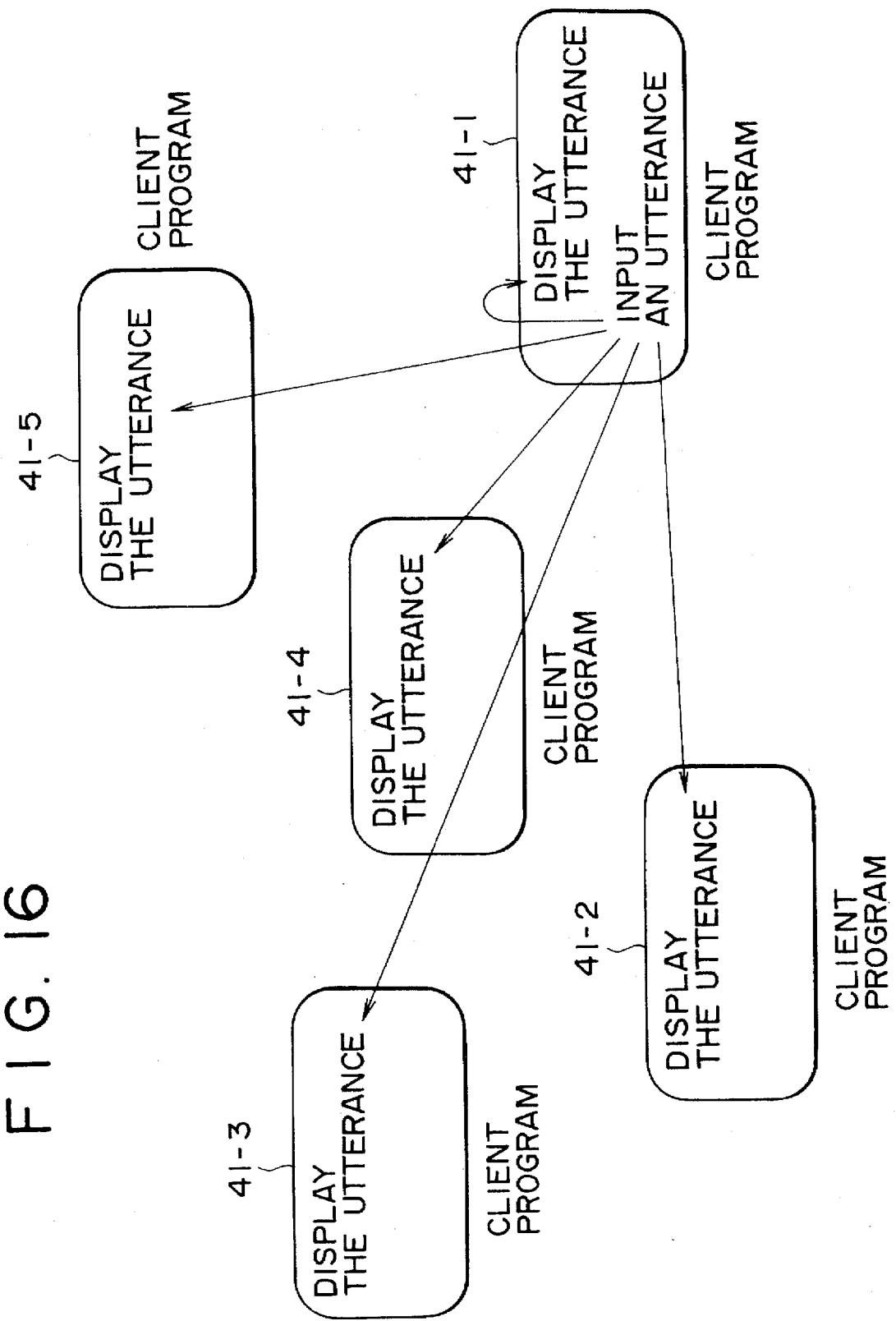

PROGRAM FUNCTION EXTENDING METHOD AND APPARATUS AND DATA PROCESSING METHOD

BACKGROUND OF THE INVENTION

1. Field of the Invention

In general, the present invention relates to a program function extending method and a data processing method more particularly to a data processing method and a good program function extending method which is used when a new function is extended in a system having a basic function for receiving and transmitting text data.

2. Description of Related Art

A conference system, already known, is built by connecting a plurality of terminals to each other through a network. In such a conference system, when text data is entered from a terminal by operating the keyboard thereof, not only do characters representing the text data appear on the display unit of the terminal, but the text data is also transmitted to other terminals through the network and the characters representing the text data appear on the display units of the other terminals as well.

A typical configuration of such a conventional conference system is shown in FIG. 16. As shown in the figure, terminals 41-1 to 41-5 each have a dedicated client program. When the keyboard of a terminal is operated, the client program of the terminal generates text data according to pressed keys of the keyboard and outputs characters representing the text data to the display unit of the terminal. At the same time, the client program also transmits the text data to the other terminals by using a basic function thereof called an utterance transmission protocol.

Let, for example, predetermined characters (of an utterance) be entered to the terminal 41-1 by operating the keyboard thereof. In this case, not only does the utterance appear on the display unit of the terminal 41-1, but the utterance is also transmitted to all the other terminals 41-2 to 41-5 and the contents of the utterance appear on each of the display units of the other terminals 41-2 to 41-5.

The same processing is carried out when an utterance is entered to a terminal other than the terminal 41-1. As a result, a conference can be accomplished by exchanging texts.

In such a conventional system, however, each time a new function is extended or added, it is necessary to change the client program by providing the client program with new facilities such as a transmission protocol for the new function and a user interface for utilizing the new function.

Let us take, as an example, a conference system having only a function for receiving and transmitting text data entered to its terminals. In order to add a function for accessing a data base, for example, it is necessary to modify each client program by defining a protocol for accessing the data base from each client program and adding a special user interface for making inquiries about the data base in conjunction with the protocol. On the top of that, such work is required each time a new function is added.

Moreover, in order to provide a new function to all conference participants, it becomes necessary to modify (or upgrade) all client programs used by the conference participants. In the case of a small-scale conference system with relatively few conference participants, the modification or upgrading of the client programs does not give rise to a serious problem. For a large number of conference participants at locations far away from each other, on the other hand, another problem rises that it costs a lot of money and takes much time and labor to always keep the most recent program at the terminals of all the conference participants. It is actually all but impossible to always keep the most recent program at the terminals of all the conference participants.

The present invention addresses the problems described above, allowing a new function to be added easily and speedily as well as done at a low cost.

In a program function extending method according to one aspect of the invention, an extended function program is added when a new function is extended. In this extended function program, specific data is associated with predetermined processing. When this specific data is detected among data received by the basic function, the predetermined processing is carried out. A result output by the predetermined processing is then transmitted as predetermined data by means of the basic function.

In a program function extending method according to a second aspect of the invention, a function extending object is added when a new function is added to an object program having a basic function. In this function extending object, specific text data of text data displayed by the basic function is associated with predetermined processing. When this specific text data is detected among data received by the basic function, the predetermined processing is carried out. A result output by the predetermined processing is then transmitted as text data by means of the basic function.

A data processing method according to a third aspect of the invention is a data processing method adopted by a data processing system comprising a plurality of data processing apparatuses wherein an extended function program is brought into one of the data processing apparatuses whenever a new function is added. In this extended function program, specific data is associated with predetermined processing. When this specific data is detected among data received by the basic function, the predetermined processing is carried out. A result output by the predetermined processing is then transmitted as predetermined data by means of the basic function.

With the program function extending method according to one aspect of the invention, an extended function program including a new function to be added is newly incorporated. Data obtained as a result of processing carried out by the extended function program is transmitted by means of the basic function.

With the program function extending method according to a second aspect of the invention, when a new function is added to an object program having the basic function, an extended function object program including the new function is newly incorporated. The extended function object program includes processing for displaying text data obtained as a result of the processing by means of the basic function.

With the data processing method according to a third aspect of the invention, when a new function is added to a data processing system comprising a plurality of data processing apparatuses, an extended function program is newly incorporated in one of the data processing apparatuses. Data obtained as a result of processing carried out by the extended function program is transmitted by the basic function to other data processing apparatuses which do not have the extended function program.

BRIEF DESCRIPTION OF THE DRAWINGS

FIG. 16 is a diagram used for explaining the basic function of the conventional data processing system.

DESCRIPTION OF THE PREFERRED EMBODIMENTS

Figure 1:
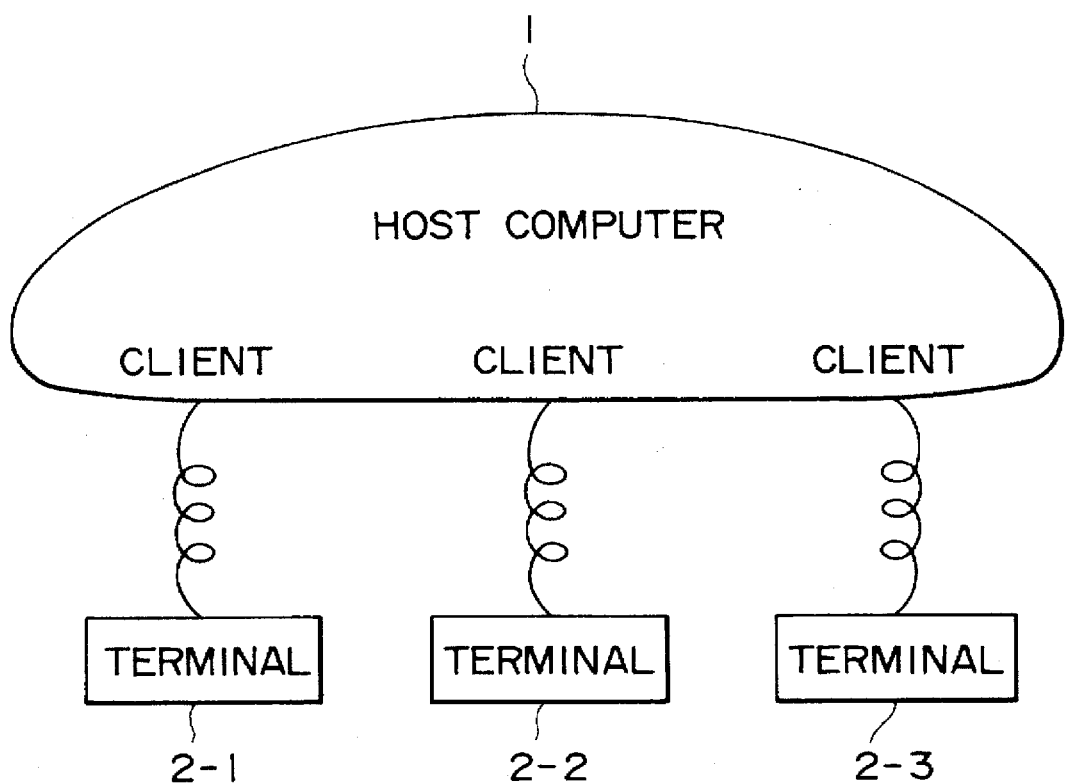
FIG. 1 is a diagram showing a typical configuration of a data processing system to which the present invention is applied.

A typical configuration of a data processing system to which the present invention is applied is shown in FIG. 1. In this embodiment, a plurality of terminals 2-1 to 2-3 are connected to a center, a central apparatus 1 which is usually implemented as a host computer. The host computer 1 has client programs associated with the terminals 2-1 to 2-3 and the terminals 2-1 to 2-3 execute a variety of processing in accordance with the client programs associated therewith. In the case of this embodiment, a plurality of client programs are executed by the host computer 1 and an utterance transmission protocol is implemented through communication among the programs.

Figure 2:
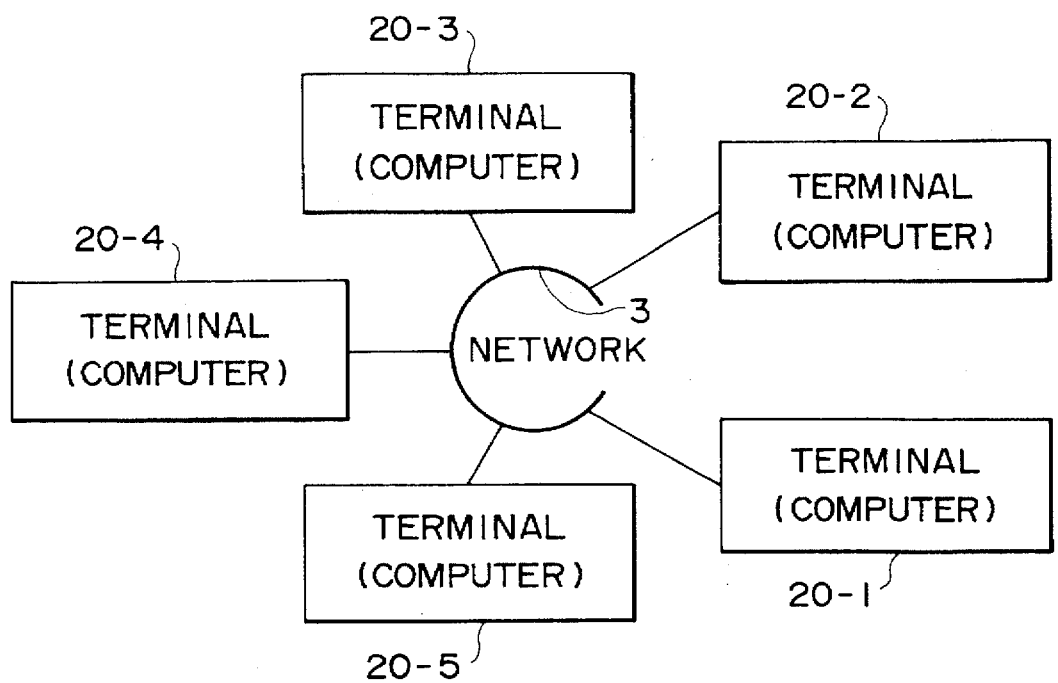
FIG. 2 is a diagram showing another typical configuration of a data processing system to which the present invention is applied.

Another typical configuration of a data processing system to which the present invention is applied is shown in FIG. 2. In this embodiment, a plurality of terminals 20-1 to 20-5, each implemented by typically a personal computer, are connected to each other through a network 3. A client program is executed in each of the terminals 20-1 to 20-5. The client programs operate independently of each other, implementing an utterance transmission protocol by means of network communication.

Figure 3:
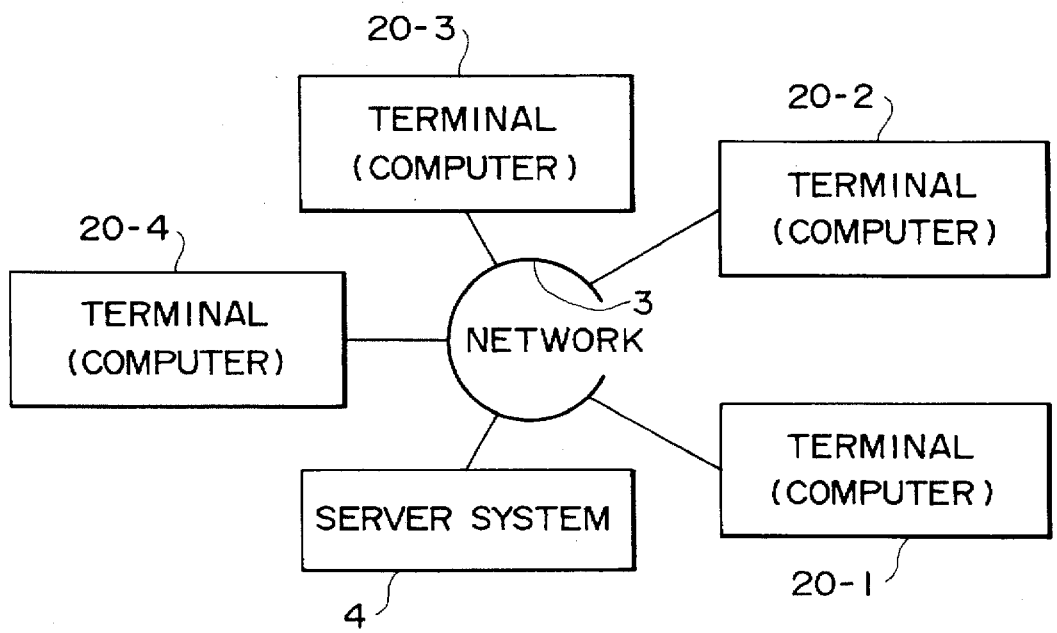
FIG. 3 is a diagram showing still another typical configuration of a data processing system to which the present invention is applied.

Still another typical configuration of a data processing system to which the present invention is applied is shown in FIG. 3. In this embodiment, a server system 4 and a plurality of terminals 20-1 to 20-4 are connected to a network 3. An independent client program is executed in each of the terminals 20-1 to 20-4. In addition, a server program runs on the server system 4.

Figure 4:
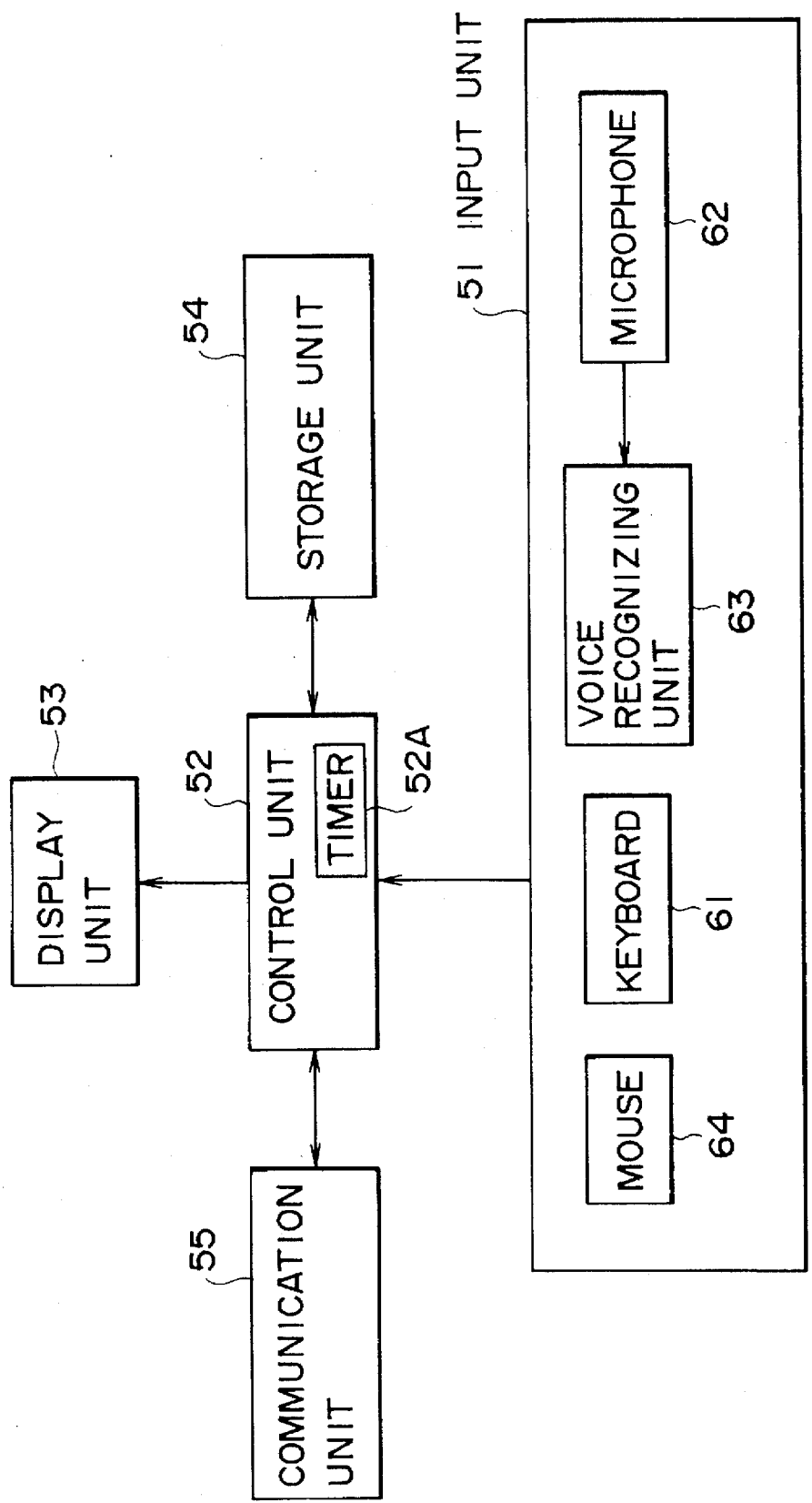
FIG. 4 is a diagram showing a typical configuration of a terminal used in a data processing system provided by the present invention.

In the case of the embodiments described above, the terminals 2-1 to 2-3 and 20-1 to 20-5 can each be implemented by the so-called ordinary personal computer. A typical configuration of a terminal based on a personal computer is shown in FIG. 4. In the case of this embodiment, a keyboard 61 is provided to serve as an input unit 51. By operating the keyboard 61, text data can be supplied to a control unit 52. In an embodiment wherein a voice recognizing unit 63 is provided in the input unit 51, an audio signal supplied from a microphone 62 is recognized by the voice recognizing unit 63. Text data obtained as a result of the voice recognition can then be supplied to the control unit 52. In addition, a mouse 64 is provided in the input unit 51 so as to allow a position command to be input.

The control unit 52 outputs characters representing the text data supplied from the input unit 51 to a display unit 53. In addition, the text data is also transmitted to other terminals, the host computer 1 or the server system 4 through a communication unit 55. Also, text data transmitted from those apparatuses is received through the communication unit 55 and output to the display unit 53.

A storage unit 54 is used for appropriately storing data supplied by the input unit 51 or data received through the communication unit 55. A timer 52A embedded in the control unit 52 is used for updating the current time of the day.

It should be noted that, basically, the host computer 1 and the server system 4 have the same configuration.

Figure 5:
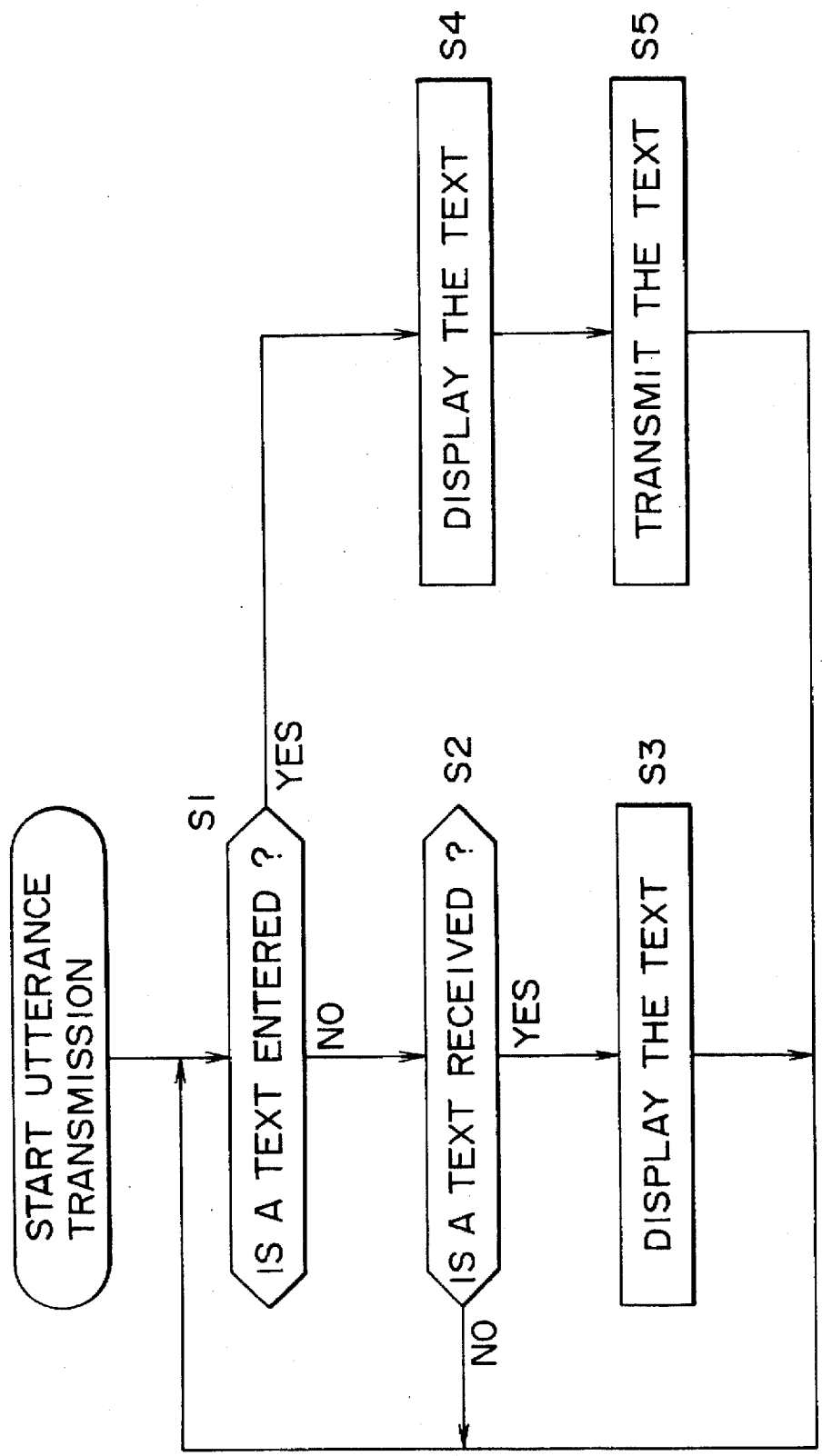
FIG. 5 is a flowchart showing the processing of a basic function owned by each apparatus in a data processing system provided by the present invention.

The client programs executed by the host computer 1 and the terminals 2-1 to 2-3 shown in FIG. 1, the terminals 20-1 to 20-5 shown in FIG. 2 and the terminals 20-1 to 20-4 shown in FIG. 3 and the server program executed by the server system 4 shown in FIG. 3 each have an utterance transmission protocol which is used as part of a basic function shown in FIG. 5.

As shown in FIG. 5, at a first step S1, a judgment is made to determine whether or not predetermined characters have been entered by operating the keyboards 61 of the terminals 2-1 to 2-3. The judgment made at the step S1 also applies to the terminals 20-1 to 20-5, the host computer 1 and the server system 4 as well. If the predetermined characters are found supplied at the step S1, the processing flow continues to a step $4 to generate text data corresponding to the operated keys. Characters representing the text data are then output to the display unit 53, typically an LCD or a CRT, of the apparatus. The processing flow then proceeds to a step S5 to transmit the text data represented by the displayed characters to other terminals and the host computer 1 or the server system 4.

If the predetermined characters are found not supplied at the step S1, on the other hand, the processing flow continues to a step S2 to determine whether or not text data has been transmitted from another terminal 2-i or 20-i, the host computer 1 or the server system 4. If no text data has been transmitted, the processing flow returns to the step S1 to repeat the execution of the same processing.

If text data is found transmitted from another apparatus at a step S2, on the other hand, the text data is received before proceeding to a step S3 to output characters representing the text data to the display unit 53.

As described above, the terminal 2-i or 20-i, the host computer 1 or the server system 4 outputs characters supplied to the apparatus thereof to the display unit 53 and also outputs characters representing text data transmitted from another apparatus, if any, to the display unit 53. In this way, a conference system can be built from the terminals 2-1 to 2-3 or 20-1 to 20-5, the host computer 1 and the server system 4 which constitute a data processing system.

That is to say, characters representing an utterance input from an apparatus are output to the display unit of the apparatus and transmitted to all other apparatuses for display purposes. In this way, an utterance generated from a terminal of an apparatus is transmitted and displayed to all other apparatuses. As a result,, utterances are transmitted and received, allowing a conference to be implemented.

In such a data processing system (or a conference system), let us assume that only a basic function for transmitting and receiving an utterance is provided. In this case, when a new function is to be added (or extended) to the system, a client program for processing the new function is added to at least one of the apparatuses composing the data processing system. An example of the apparatus to which the client program is to be added is the host computer 1. The newly added client program (or extended function program) comprises a processing routine for determining whether or not specific data set in advance exists in text data transmitted from another apparatus, a processing routine to be executed when the specific data set in advance exists in text data transmitted from another apparatus and a processing routine allowing data resulting from the execution of the second processing routine to be transmitted to other apparatuses as text data.

Figure 6:
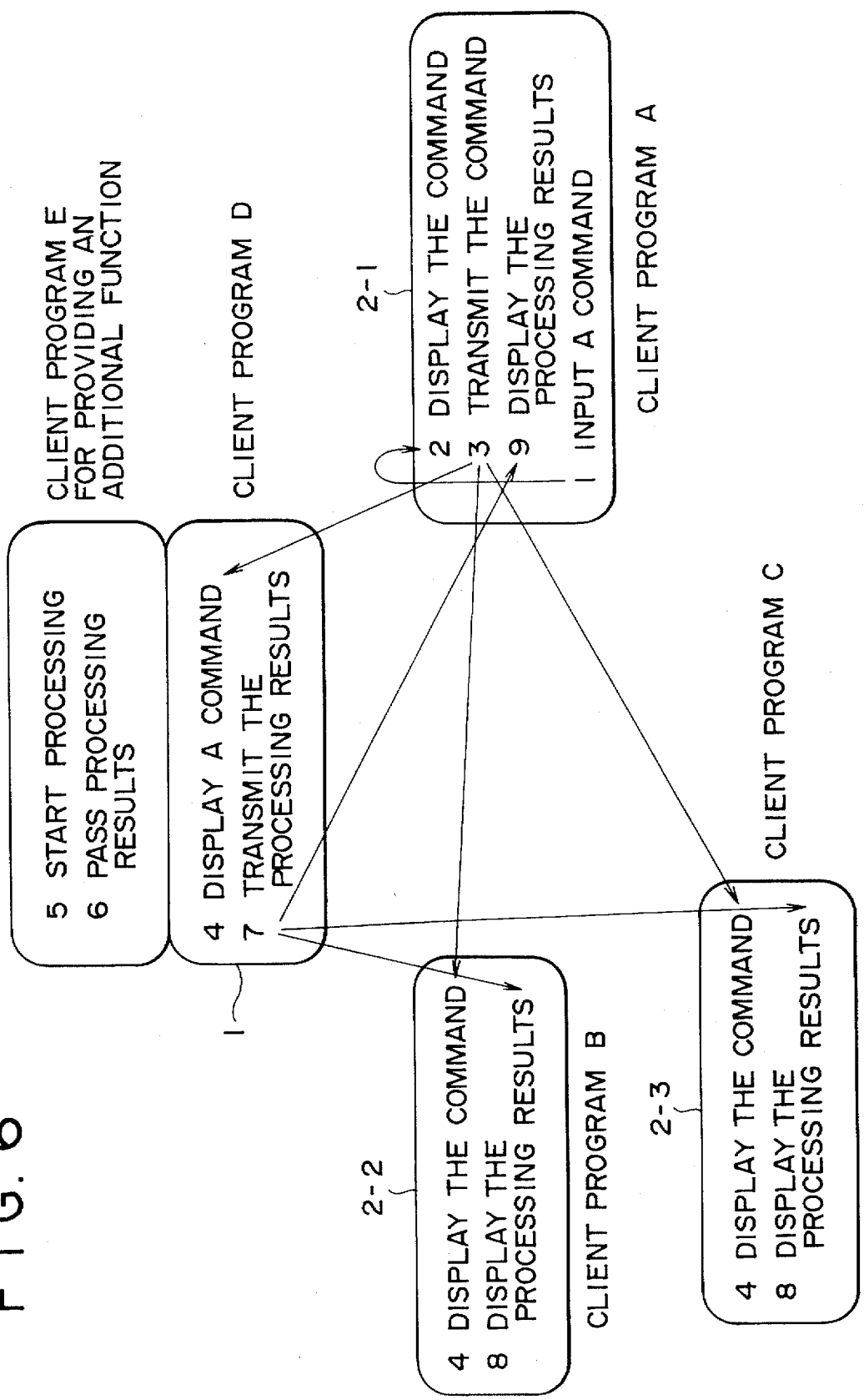
FIG. 6 is a diagram used for explaining operations with an extended function added.

For example, a participant to a conference system using a client program as shown in FIG. 6 enters a text expressing a specific command in the same way as an ordinary utterance. In this case, the basic function of FIG. 5 described earlier outputs the utterance to the display unit 53 associated with the client program A as well as transmits the utterance to other apparatuses, that is, the terminals 2-2 and 2-3 and the host computer 1. The other apparatuses also have client programs B, C and D for processing the basic function shown in FIG. 5 for outputting the utterance transmitted from the terminal 2-1 to their display units 53.

Figure 7:
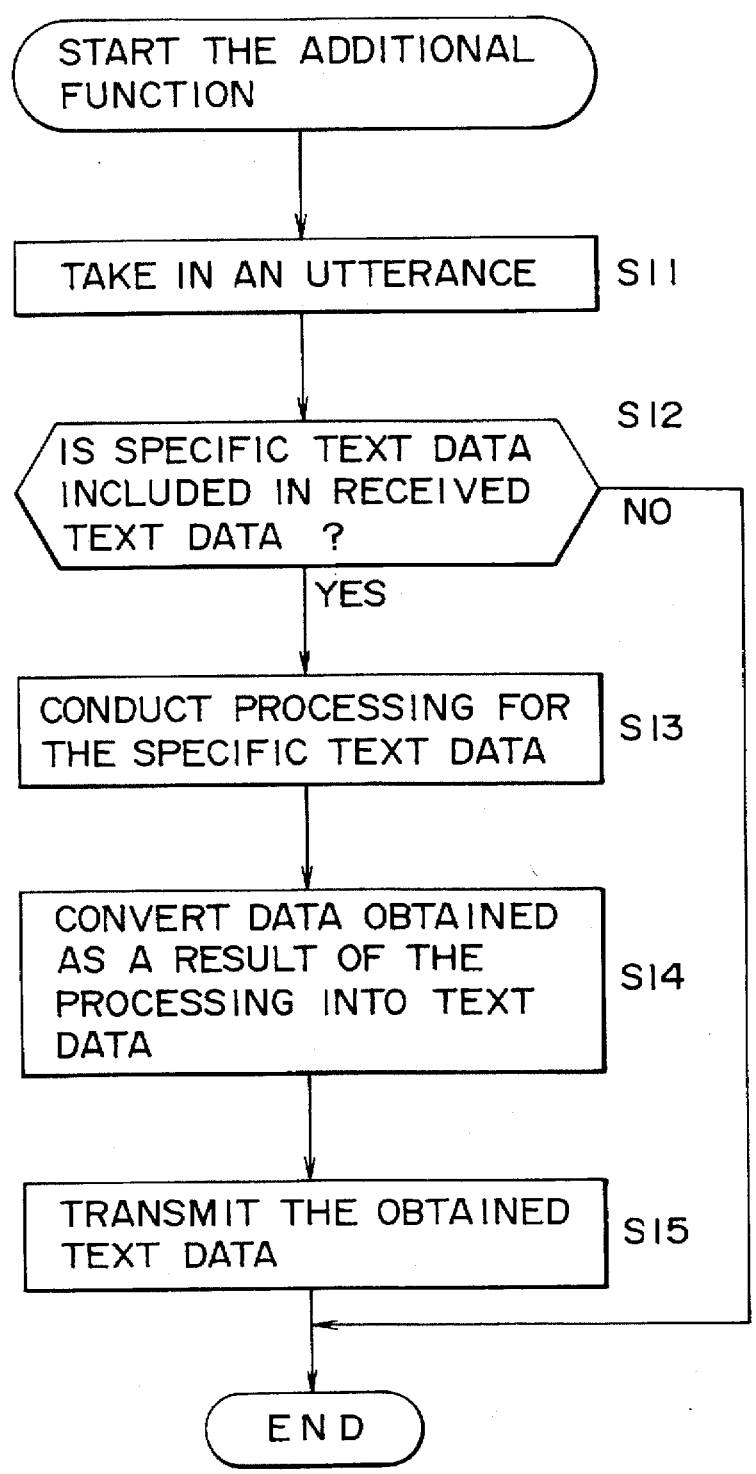
FIG. 7 is a flowchart showing an example of an extended function program.

Let a client program E be added to the host computer 1 for executing the processing of an added function shown in FIG. 7. At an initial step S11, the host computer 1 executes processing to take in text data received by a client program D, passing the text data to the client program E. The processing flow continues to a step S12 to determine whether or not specific text data set in advance exists in the text data taken passed to the client program E. If the specific text data exists in the received text data, the processing flow continues to a step S13 to execute predetermined processing associated with the specific text data. That is to say, the predetermined processing itself is the newly added function.

The processing flow then proceeds to a step S14 to convert data obtained as a result of the processing carried out at the step S13 into text data. The processing flow subsequently continues to a step S15 to carry out processing necessary for transmitting the text data created at the step S14 to other apparatuses. To be more specific, the at the step S14, the processing is carried out to pass the text data to the client program D as input data. Receiving the input data, the client program D typically transmits the text data obtained at the step S14 to the terminals 2-1 to 2-3 as shown in FIG. 6.

If the specific text data is found not existing in the received text data at the step S12, on the other hand, the processings at the steps S13 to S15 are skipped.

As described above, when the specific text data is entered to the terminal 2-1, it is possible to obtain results of processing associated with the specific test data. The client program A of the terminal 2-1 is not specially changed and has only the basic function. This holds true for the client programs B, C and D. In essence, nonetheless, the new function which did not exist so far can be implemented by merely transmitting the specific text data.

Figure 8:
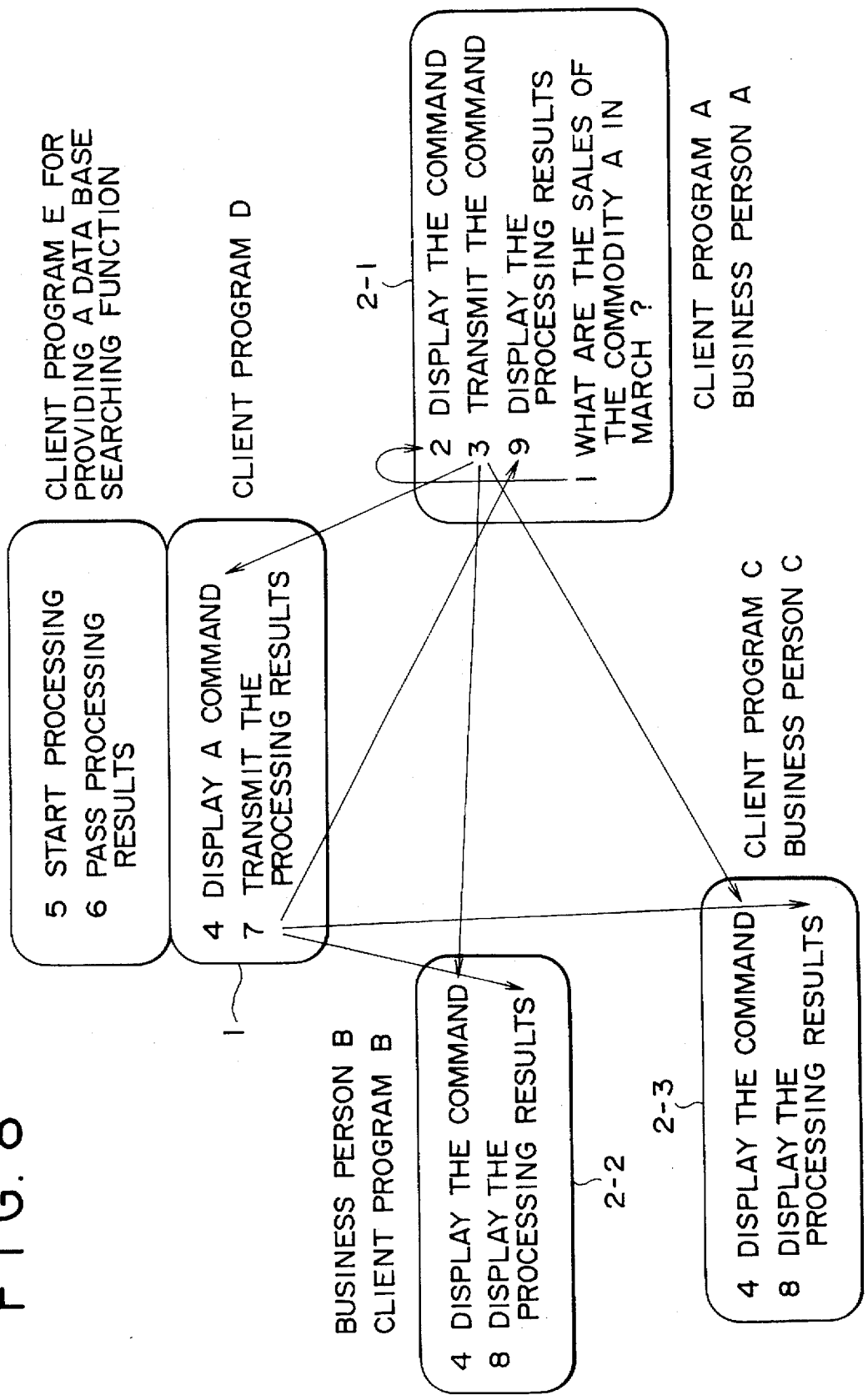
FIG. 8 is a diagram used for explaining operations with a data base searching function added.

FIG. 8 shows an actual example of a newly added client program. This embodiment implements an example of extending (or adding) a data base searching function in a conference system for business purposes. The terminals 2-1 to 2-3 and the host computer 1 have the client programs A to D respectively. The client programs A to D are used for executing the basic function shown in FIG. 4 in the same way as is described before. That is to say, the client programs A to D have functions to transmit a received utterance to other apparatuses and receive as well as display an utterance transmitted by another apparatus. On the other hand, the host computer 1 has an additional client program E for executing the data base searching function shown in FIG. 9 besides the client program D for the basic function.

Figure 9:
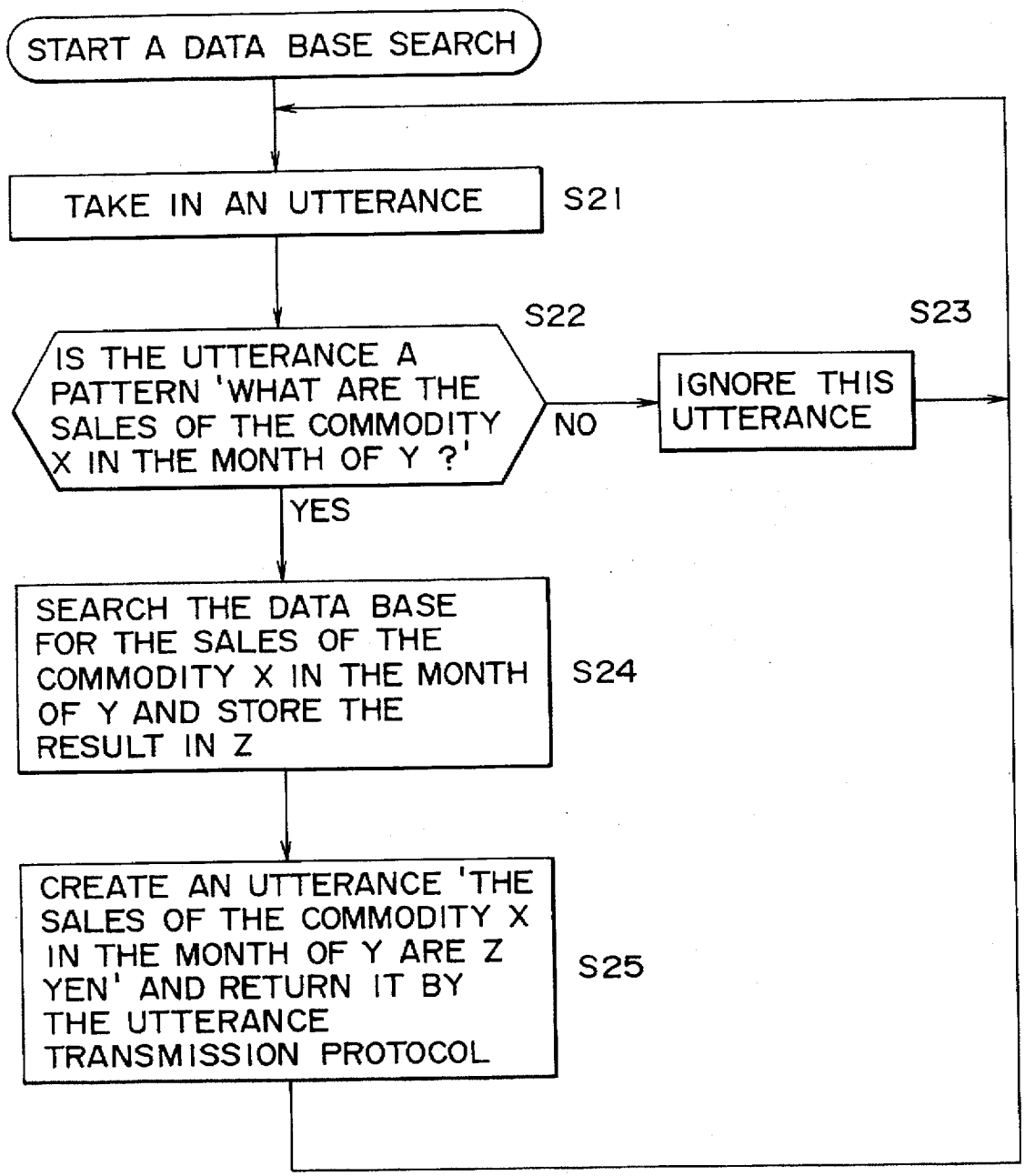
FIG. 9 is a flowchart used for explaining the processing of an extended function program of the data base searching function.

As shown in FIG. 9, at an initial step S21, the client program E takes in an utterance transmitted by another apparatus, that is, by the terminal 2-1, 2-2 or 2-3, which utterance has been received by the client program D.

The processing flow then continues to a step S22 to determine whether or not the received utterance is a pattern 'What are the sales of the commodity X in the month of Y?' If the utterance taken in at the step S21 does not include this pattern, the utterance is treated as one not requiring special processing. In this case, the processing flow continues to a step S23, ignoring the utterance. The processing then returns to the step S21 to receive a next utterance.

If the utterance is found at the step S22 to be the pattern 'What are the sales of the commodity X in the month of Y?,' on the other hand, the processing flow continues to a step S24 to access a sales data base in order to search for the sales of the commodity X in the month of Y. A result of the search is then stored in a variable Z. Subsequently, the processing flow continues to a step S25 to create an utterance 'The sales of the commodity X in the month of Y are Z yen' from the data stored in the variable Z and pass the utterance to the client program D as an input utterance. Then, the processing flow returns to the step S21 to repeat the execution of the same processing for a new utterance.

Let, for example, an utterance 'What are the sales of the commodity A in March?' be entered to the terminal 2-1 shown in FIG. 8. Not only is the utterance output to the display unit 53 of the terminal 2-1, but the utterance is also transmitted to the terminals 2-2 and 2-3 as well as the host computer 1 to be output to the display units 53 thereof.

With a new client program E not added, only the processing described above is carried out. With a new client program E added, however, the client program E added to the host computer 1 determines whether or not the received utterance includes the pattern 'What are the sales of the commodity X in the month of Y?'. In this case, the utterance 'What are the sales of the commodity A in March?' received from the terminal 2-1 is the pattern of interest. Therefore, the data base is accessed to search for the sales of the commodity A in March. A result of the search is then stored in the variable Z.

An utterance 'The sales of the commodity X in the month of Y are Z yen' is then created from the data stored in the variable Z and passed to the client program D. The client program D then transmits this utterance to the terminals 2-1 to 2-3 and the host computer 1. Receiving the utterance (or a result of the search), the terminals 2-1 to 2-3 and the host computer 1 output it to their display units 53.

In the case of this embodiment, by merely adding the client program E to the host computer 1, a data base searching function which could not be carried out so far can now be executed. By adding such a function, it is not necessary to change the basic functions owned by the terminals 2-1 to 2-3 and the host computer 1 and the user interfaces of the client programs for utilizing the search function.

In the case of this embodiment, the pattern to be searched is in the form 'What are the sales of the commodity X in the month of Y?'. It should be noted that it is also possible to have different kinds of patterns to be specified as search objects. By assigning processing of a predetermined data base search to each pattern, various kinds of search operations can be carried out.

Clerical and secretarial functions and a function to count votes to lead to a decision by majority clan further be added to this conference system.

Figure 10:
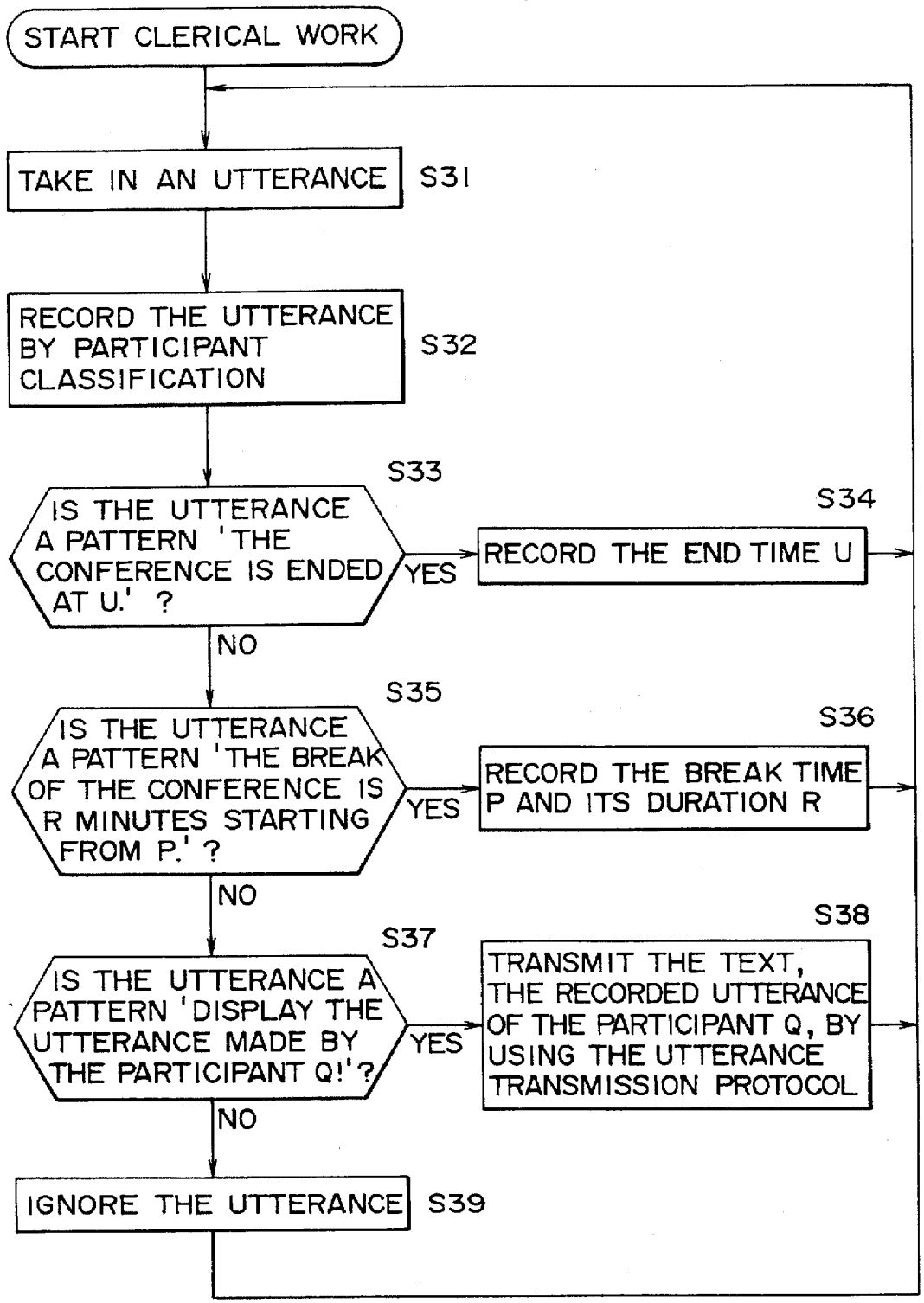
FIG. 10 is a flowchart showing typical operations of an extended function program of clerical processing.

FIG. 10 shows a typical clerical client program which is added as a client program E. The clerical client program E has a function for recording utterances classified by conference participant and recording/searching functions. At an initial step S31 of FIG. 10, processing to take in an utterance received by the basic function is carried out. The processing flow then continues to a step S32 to record the utterance on a participant-classified basis. To be more specific, the utterance is recorded as one generated by the terminal 2-1, 2-2 or 2-3 or the host computer 1. The processing flow then continues to a step S33 to determine whether or not the utterance taken in at the step S31 includes a pattern 'The conference is ended at U.' If the utterance taken in at the step S31 includes this pattern, the processing flow continues to a step S34 to record the completion time U of the conference which is now under way.

If the utterance taken in at the step S31 does not include this pattern, on the other hand, the processing flow continues to a step S35 to determine whether or not the utterance taken in at the step S31 includes a pattern 'The break of the conference is R minutes starting from P.' If the utterance matches this pattern, the processing flow continues to a step S36 to record P as a starting time of the break and R as a length of the break.

If the utterance is found different from this pattern at the step S35, on the other hand, the processing flow proceeds to a step S37 to determine whether or not the utterance includes a pattern 'Display the utterance made by the participant Q!' If the utterance matches this pattern, the processing flow continues to a step S38 to read out a recorded utterance of the participant Q from a storage of utterances recorded on a participant-classified basis at the step S32. The read out utterance is then transmitted as text data by an utterance transmission protocol, part of the basic function shown in FIG. 4.

As the predetermined processings at the steps S34, S36 and S38 are completed, the processing flow returns to a step S31 to repeat the execution of the same processing for a next utterance.

If the utterance is found not matching the last pattern at the step S37, on the other hand, the processing flow continues to a step S39 to ignore the utterance. The processing flow then returns to a step S31 to repeat the execution of the same processing for a new utterance.

Figure 11:
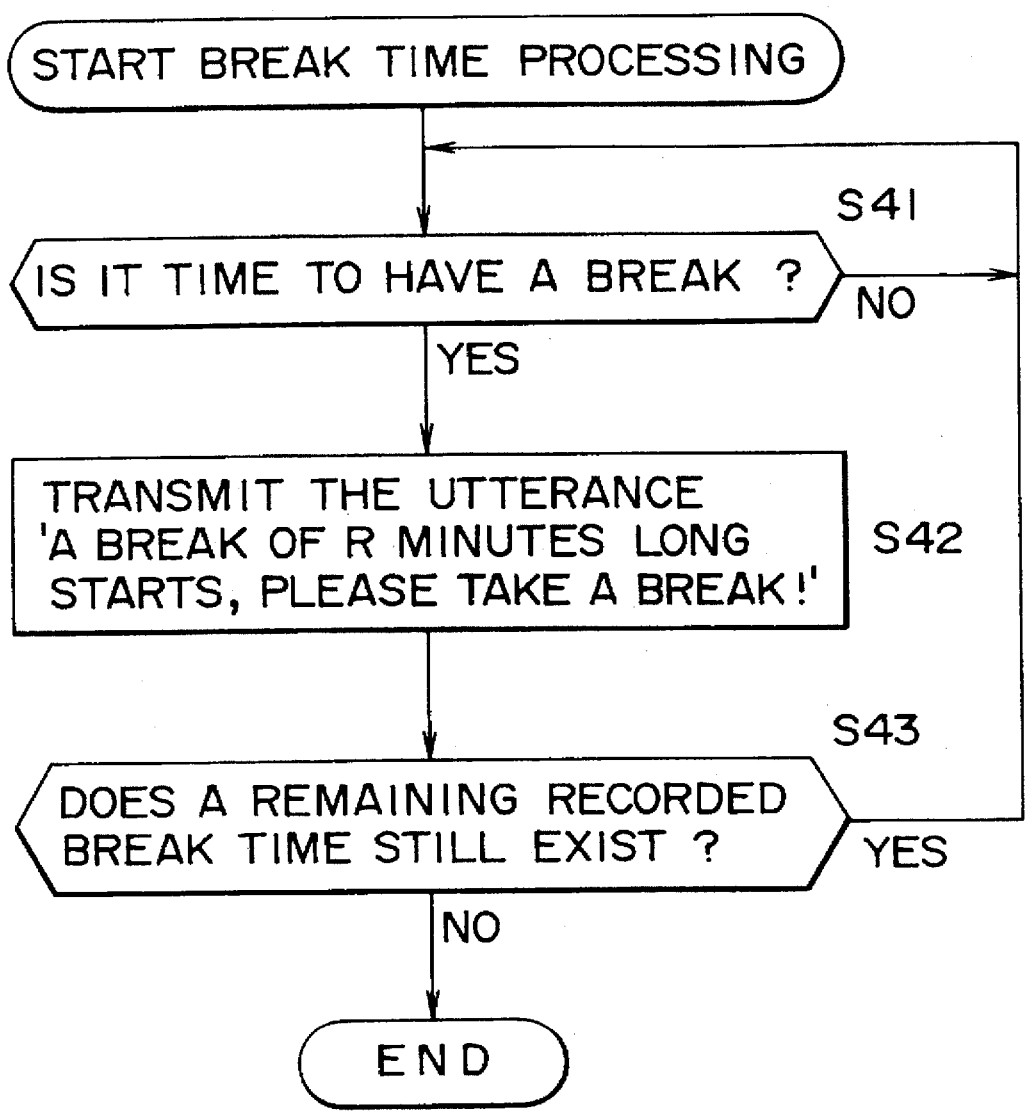
FIG. 11 is a flowchart showing typical operations of an extended function program of break time processing.

When the break time P and the length R are recorded at the step S36, break time processing shown in FIG. 11 is further carried out. At the first step S41 shown in FIG. 11, the present time computed by a timer 52A keeps being updated until it reaches the break time P recorded at the step S36. As the updated present time becomes equal to the break time P, the processing flow continues to a step S42 to generate an utterance 'A break of R minutes long starts, please take a break' and to pass the utterance to the client program D. Receiving the utterance text, the client program D in turn transmits the utterance to the terminals 2-1 to 2-3.

The processing flow then continues to a step S43 to examine whether or not other remaining recorded break times exist. If another break time is found left, the processing flow returns to a step S41 to repeat the execution of the same processing. If no other break time is found left, on the other hand, the processing is ended.

In this way, for example, an utterance 'The break of the conference is taken at P for a period of R minutes.' can be generated from the terminal which plays the role of the chairman of the conference. When this utterance is generated, the present time is monitored. As the present time becomes equal to the break time, the utterance announcing the break time is transmitted to each terminal.

Figure 12:
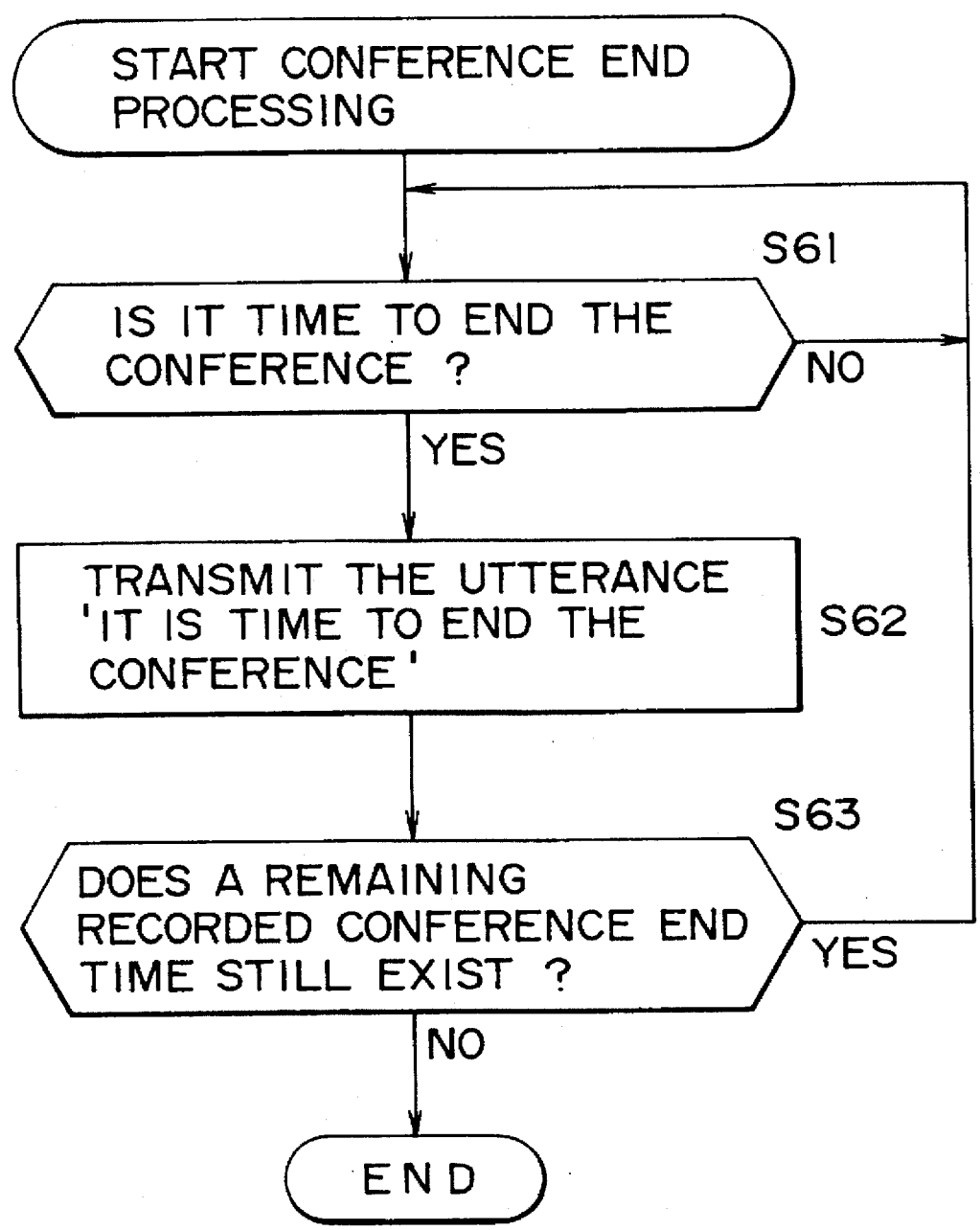
FIG. 12 is a flowchart showing typical operations of an extended function program of conference end processing.

In addition, when the end time of the conference is recorded at the step S34, conference end processing shown in FIG. 12 is started. At the first step S61 of the figure, the present time is updated until it reaches the recorded end time U. As the present time becomes equal to the end time U, the processing flow continues to a step S62 to generate an utterance 'It is time to end the conference' which is then passed to the client program D. The client program D, in turn, transmits the text it received to the terminals 2-1 to 2-3.

The processing flow then continues to a step S63 to determine whether or not another remaining time recorded as a conference end time exists. If another conference end time is found left, the processing flow returns to a step S61 to repeat the execution of the same processing. If no other conference end time is found left or if no other conference exists, on the other hand, the processing is terminated.

In this way, when an utterance of the pattern 'The conference will be ended at U,' is generated, the end time U is recorded. As the present time becomes equal to the end time U, the utterance to end the conference is automatically transmitted to each terminal.

It is obvious from the processing examples that, it is not always necessary to transmit an utterance, to be made as a result of processing, immediately after the processing. Instead, the utterance can be transmitted at a specified time.

Figure 13:
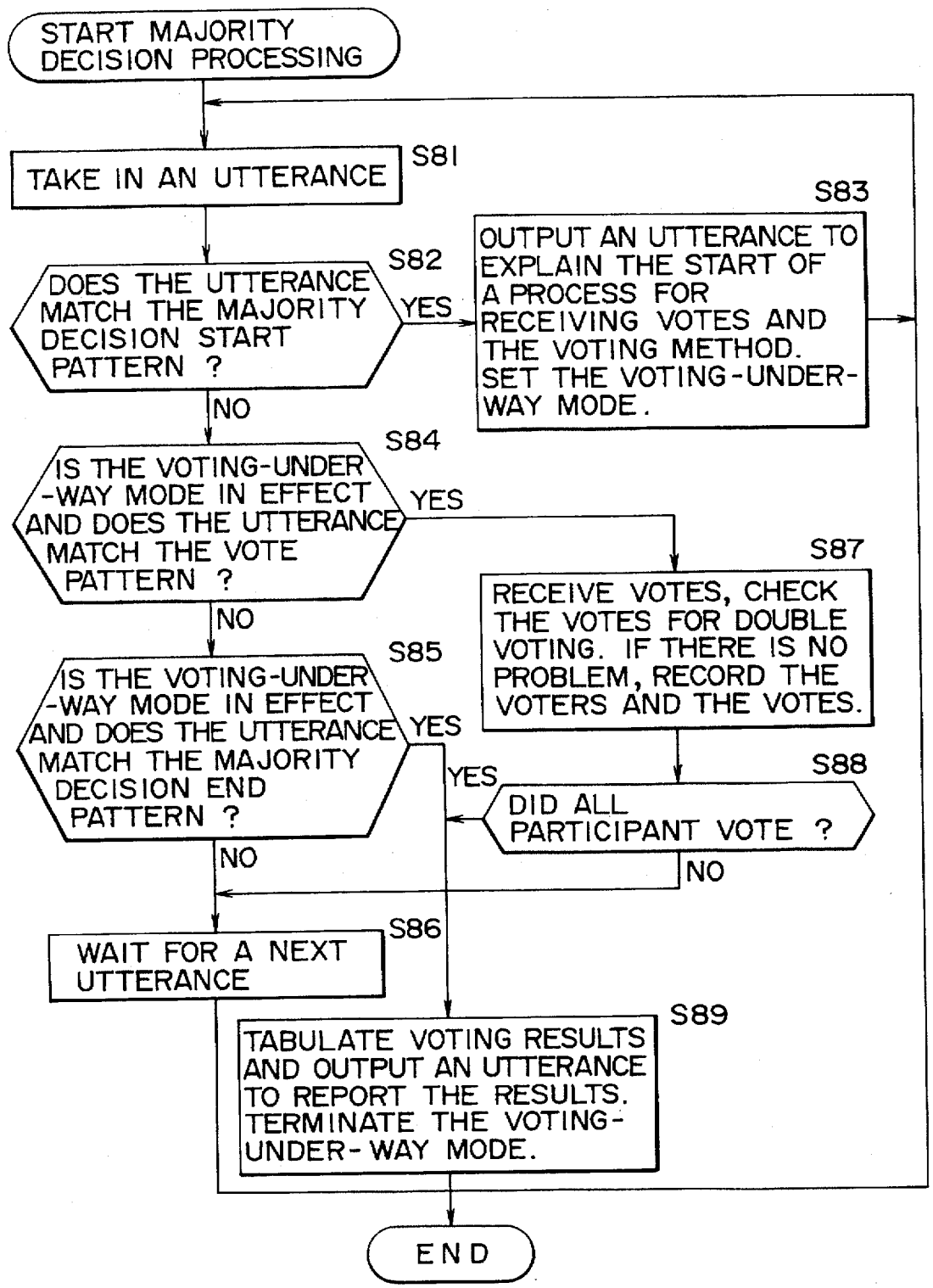
FIG. 13 is a flowchart showing typical operations of an extended function program of majority decision processing.

Furthermore, with this conference system, when it is desired to make a decision based on the majority's desire, a majority decision program shown in FIG. 13 is added as a client program E.

At the initial step S81 of this program, an utterance received by the utterance transmission protocol (the client program D) is taken in. The processing flow then continues to a step S82 to determine whether or not the utterance matches a majority decision start pattern. A typical majority decision start pattern has the form of 'The majority decision process starts: The number of selection objects=S, Selection objects: 1=[T1], 2=[T2], . . . ' wherein S is the total number of selection objects and T1, T2 etc. are descriptions of the selection objects.

If the utterance taken in at the step S81 matches the majority decision start pattern, the processing flow continues to a step S83 to create an utterance describing the voting method and to pass the utterance to the client program D. The client program D, in turn, transmits the utterance to the terminals 2-1 to 2-3. Then, at the client program E, a voting-under-way mode is set to start receiving votes. The processing flow later on returns to the step S81 to repeat the execution of the subsequent processings including the step S81 for a new utterance.

If the utterance taken in at the step S82 does not match the majority decision start pattern, on the other hand, the processing flow continues to a step S84 to determine whether or not the voting-under-way mode is in effect and whether or not the utterance taken in matches a vote pattern 'Vote: V' where V is the number of a selection object. Voting can thus be done at each terminal by outputting the pattern 'Vote: V.'

If the utterance taken in is determined not to match this vote pattern, the processing flow continues to a step S85 to determine whether or not the voting-under-way mode is in effect and whether or not the utterance taken in matches a majority decision end pattern. A typical majority decision end pattern is 'The voting is ended.'

If the utterance taken in is determined not to match the majority decision end pattern at the step S85, the processing flow proceeds to a step S86 to wait for a next utterance to be entered. As the next utterance is input, the processing flow returns to the step S81 to repeat the execution of the same processing for the next utterance.

If the voting-under-way mode is found in effect and the utterance taken in is determined to match the vote pattern at the step S84, on the other hand, the processing flow continues to a step S87 to receive a vote and to make sure that the vote is not a double vote. If the vote is found to be not a double vote, the voter and the vote are recorded. To be more specific, if any terminal outputs an utterance of the pattern 'Vote: V,' the utterance and the terminal are recorded. If an already recorded terminal outputs an utterance again of the same pattern, the utterance will be regarded as a double vote and, thus, ignored.

The processing flow then continues to a step S88 to determine whether or not all conference participants have voted. The judgment at the step S88 is made by determining whether or not a terminal not recorded at the step S87 exists. Thus, the judgment at the step S88 can be made because, at the step S87, a vote is recorded for each terminal. If not all conference participants have voted, the processing flow returns to the step S81 through the step S86 to wait for a new utterance to be entered and to repeat the execution of the same processing for the new utterance.

If all conference participants are found to have voted at the step S88, or the utterance is found matching the majority decision end pattern at the step S85, on the other hand, the processing flow continues to a step S89 to end the voting-under-way mode, tabulate voting results, create an utterance reporting the tabulated result and pass the utterance to the client program D. The client program D, in turn, transmits the utterance to each terminal.

Figure 14:
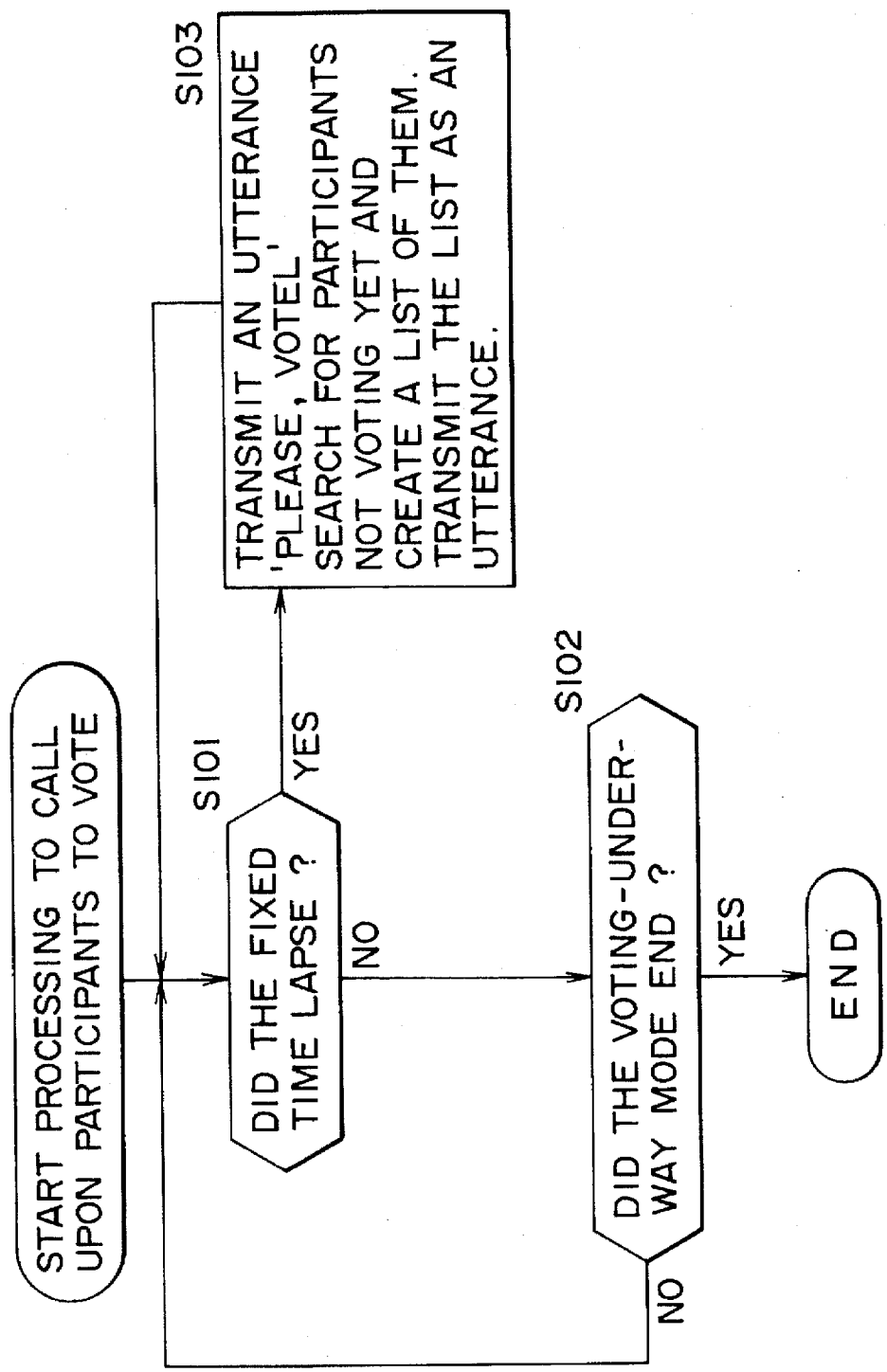
FIG. 14 is a flowchart showing typical operations of an extended function program of processing to call upon participants to vote.

It should be noted that, in the voting-under-way mode, processing to call upon conference participants to vote shown in FIG. 14 is carried out. As shown in the figure, the processing begins with an initial step S101 to determine whether or not a fixed time has lapsed since the setting of the voting-under-way mode. If the fixed time has not lapsed yet, the processing flow continues to a step S102 to determine whether or not the voting-under-way mode has been terminated. If the voting-under-way mode has not been terminated, the processing flow returns to the step S101 again to determine whether or not a fixed time has lapsed. The steps 101 and 102 are repeated till the fixed time lapses. As the fixed time lapses, the processing flow continues to a step S103 to generate an utterance 'Please, vote!' Records created at the step S87 are then searched for conference participants who have not voted yet and a list of such conference participants is created. The list is then passed to the client program D as an utterance. The client program D finally transmits these utterances to the terminals 2-1 to 2-3. After completing such processing to call upon the conference participants to vote, the processing flow returns to a step S101 to repeat the execution of the subsequent processings including the step S101.

In this way, in the voting-under-way mode, the conference participants who have not voted are called upon to vote at fixed time intervals.

In the case of the embodiments described above, an utterance which serves as a trigger of the processing of an added extended function program is compared to a pattern to find out whether or not the utterance matches the pattern. It should be noted, however, that processing to recognize an utterance can also be carried out, for example, to determine whether or not the processing of an extended function is to be started as is shown in FIG. 15.

Figure 15:
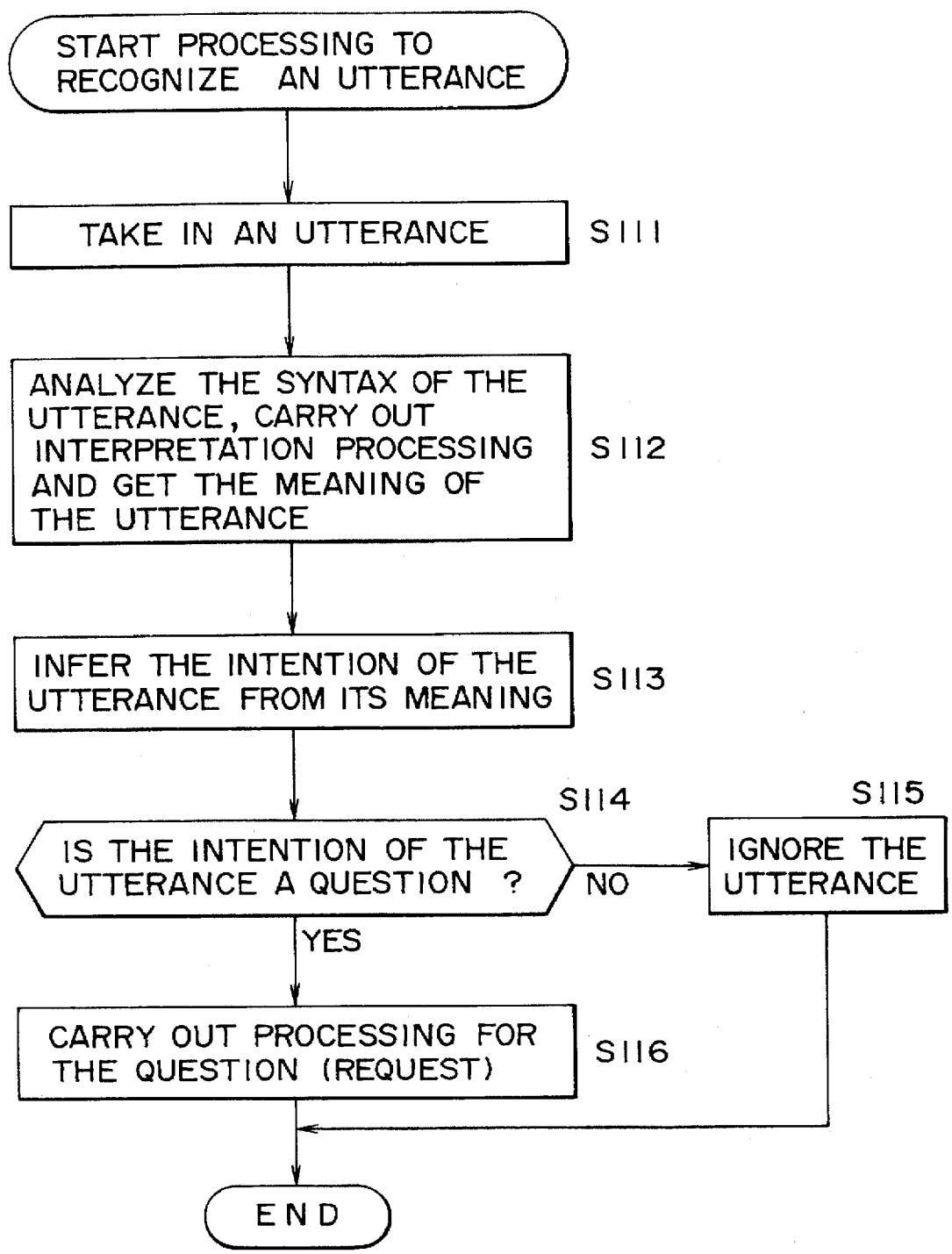
FIG. 15 is a flowchart showing typical operations of utterance recognizing processing.

To put it in more detail, in the case of the embodiment shown in FIG. 15, an incoming utterance is taken in at a step S111. The processing flow then continues to a step S112 to analyze the syntax of the utterance taken in at the step S111 and further carry out interpretation processing in order to get the meaning of the utterance. The processing flow then continues to a step S113 to infer the intention of the utterance from the meaning obtained at the step S112.

Subsequently, the processing flow continues to a step S113 to determine whether or not the intention of the utterance inferred at the step S112 is a question (or a request). That is to say, this processing corresponds to the judgment made in the embodiments described above to determine whether or not an utterance is a predetermined pattern. If the intention of the utterance is neither a question nor a request, the processing flow continues to a step S115 to ignore this utterance. If the intention of the utterance is a predetermined question (or a request), on the other hand, the processing flow proceeds to a step S116 to execute processing in response to the question (or the request).

By carrying out such processing, the processing of the extended function can be started more accurately.

In addition, in the case of the embodiments described above, characters (or text data) are directly entered by operating the keyboard 61 of any terminal. It should be noted, however, that as an alternative, in the case of an apparatus equipped with a voice recognizing unit 63, an audio signal input from a microphone 62 is recognized. Data resulting from the voice recognition is then converted into text data to be transmitted.

In the case of the embodiment described above, the extended program is added to the host computer 1. It is worth noting that the extended program can also be added to the server system 4 or one of the terminals 2-1 to 2-3 or the terminals 20-1 to 20-5.

As described above, a data processing system is mainly used as a conference system. It should be noted, however, that the present invention can also be applied to a cyberspace system as well.

This cyberspace system has a configuration comprising three-dimensional objects. Image information of a cyberspace is transmitted to the terminals 2-i and 20-i from the host computer 1 or the server 4 to be eventually output to the display units 53 thereof. Character objects (or user objects) having the shape of an ordinary human being are allocated to each terminal. The user of a terminal (or the participant) can experience the cyberspace by moving the user objects of its own in the cyberspace.

In this case, the user enters positional data (or movement information) to its terminal by means of a mouse or the like instead of entering text data. The positional data indicates an arbitrary location in the cyberspace to which a user object of its own is to be moved. The movement information of the user object is transmitted to the client programs running on all other terminals. Each of the client programs receiving the movement information from this terminal updates the position of the user object, which is being operated by the user outputting the movement information as an utterance, in accordance with the movement information. In actuality, information indicating that the mouse button has been pressed, for example, is also transmitted to all other terminals among other data in addition to the movement information.

In this way, in this cyberspace system, movement information (or positional information) corresponds to an utterance in the embodiment described above and processing to display a user object at a location specified by the movement information corresponds to an operation to display the utterance.

As a result, also in this cyberspace system, a new function can be added by adding an extended function program in the same way as the embodiments described above.

For example, a new agent can be added to a cyberspace in which only user objects exist. This agent is an object in the cyberspace as well as a program module taking a predetermined reaction in response to an input entered by the user. For example, when a user object approaches an agent, the system can be devised so that the agent moves slightly in a direction opposite to the user object or to run away from the user object.

To put it in more detail, as described above, the user terminals 2-i and 20-i and the host computer 1 or the server system 4 have the basic function for transmitting positional information (or movement information) of a user object and a function for receiving movement information transmitted by another terminal and displaying a user object of another apparatus at a location specified by the movement information. It is needless to say that the user terminals 2-i and 20-i and the host computer 1 or the server system 4 can each move and display the display position of a user object of its own to a location specified by its own movement information.

Likewise, the host computer 1 or the server system 4 inputs positional information of an agent entered through operations of its own keyboard, displaying the agent of its own at a position specified by the input and has a basic function for transmitting the positional information of its own agent.

In addition, an extended function to move away an agent from a user object can be added to the host computer 1 or the server system 4 as follows.

For example, let $P_e$ represent the position of the agent itself whereas $P_u$ represent the position of a predetermined user object. In this case, the positions can be expressed as follows:

$$P_e=(x_e, y_e, z_e)$$

$$P_u=(x_u, y_u, z_u)$$

In the extended function program, a distance d from Pe to $P_u$ is expressed by the following equation:

$$d=|P_e-P_u|$$

The distance d is compared to a predetermined positive coefficient k which is set in advance. If d is found smaller than k, the position $P_e$ of the agent itself is updated in accordance with the following substitution:

$$P_e=P_e+(P_e-P_u)$$

In this way, when the user object approaches the agent so that the distance from the user object to the agent becomes smaller than a predetermined value set in advance, the agent moves to a position slightly more separated away from the user object (or runs away from the user object).

It is possible to let this other agent carry out a variety of operations such as operations to change a color and generate sound, to inform the user of useful information and to record an approaching movement made by the user object when the user object is clicked by means of the mouse.

In the case of the embodiments described above, a text is displayed as a result of the processing carried out by the client program E. It should be noted, however, that an image can in addition be displayed as well.

Cases in which the present invention is applied to a conference system and a cyberspace system have been explained as examples. It should be noted, however, that the present invention can be applied to cases in which a new function is added to other data processing systems by using their basic functions. In such cases, it is not necessary to change the basic function and to add a new user interface, allowing a new function to be added with ease. On the top of that, the increase in cost can be suppressed when extending the new function.

As described above, according to a program function extending method described in one aspect of the invention, a program function extending method described in a second aspect of the invention and a data processing method described in a third aspect of the invention, when a new function is added, an extended function program including the new function is newly incorporated and when the extended function program detects specific data in data handled by a program having the basic function, predetermined processing is carried out and data obtained as a result of the predetermined processing is transmitted by means of the basic function, making it possible to extend a new function with ease and at a low cost.

What is claimed is:

1. A program function extending method for adding a new function to a program having a basic function for transmitting data and receiving predetermined incoming data wherein when a new function is added, an extended function program including said new function is newly incorporated and said extended function program includes processing, said processing comprising the steps of:

detecting specific data from said predetermined incoming data;

executing predetermined processing for said specific data if said specific data is detected in said predetermined incoming data; and converting a result obtained from execution of said predetermined processing for said specific data into said predetermined incoming data for transmission by said basic function, wherein said data is positional data in a cyberspace system; and said basic function further includes a function to display a user object at a location specified by said positional data when said positional data is received.

2. A program function extending method according to claim 1, wherein said basic function further includes a function for displaying said data when said data is received.

3. A program function extending method according to claim 1 wherein said extended function program includes processing to transmit, by means of said basic function, positional data of an agent requiring said agent to be moved away from a user object when said positional data of said user object is found to indicate a position at a distance from said agent within a predetermined range.

4. A data processing method adopted by a data processing system comprising data processing apparatuses each having a basic function for transmitting input data to all other units of said data processing apparatuses and receiving data transmitted by another unit of said data processing apparatus wherein when a new function is added, an extended function program including said new function is incorporated in one of said data processing apparatuses and said extended function program includes processing, said processing comprising the steps of:

detecting specific data from said input data provided to said data processing apparatuses;

executing predetermined processing for said specific data if said specific data is detected in said input data; and converting a result obtained from execution of said predetermined processing for said specific data into said data for transmission by said basic function.

5. A data processing method according to claim 4 wherein said data processing system is a conference system.

6. A data processing method according to claim 4 wherein said data processing system comprises a sensor apparatus and a plurality of terminals connected to said sensor apparatus with said sensor apparatus serving as a center apparatus in said data processing system.

7. A data processing method according to claim 4 wherein said data processing system comprises a server and terminals connected to a network.

8. A data processing method according to claim 4 wherein said data processing system comprises a plurality of terminals connected to a network.

9. A data processing method adopted by a data processing system, wherein said data processing system is a cyberspace system, comprising data processing apparatuses each having a basic function for transmitting input data to all other units of said data processing apparatuses and receiving data transmitted by another unit of said data processing apparatus wherein when a new function is added, an extended function program including said new function is incorporated in one of said data processing apparatuses and said extended function program includes processing, said processing comprising the steps of:

detecting specific data from said input data;

executing predetermined processing for said specific data if said specific data is detected in said input data; and converting a result obtained from execution of said predetermined processing for said specific data into said data for transmission by said basic function.

10. An apparatus for adding a new function to a program having a basic function for transmitting data and receiving predetermined incoming data wherein when a new function is added, an extended function program including said new function is newly incorporated and said extended function program includes processing, the apparatus comprising:

means for detecting specific data from said predetermined incoming data;

means for executing predetermined processing for said specific data if said specific data is detected in said predetermined incoming data; and means for converting a result obtained from execution of said predetermined processing for said specific data into said predetermined incoming data for transmission by said basic function, wherein said data is positional data in a cyberspace system; and said basic function further includes a function to display a user object at a location specified by said positional data when said positional data is received.

11. An apparatus according to claim 10, wherein said basic function further includes a function for displaying said data when said data is received.

12. An apparatus according to claim 10, wherein said extended function program includes processing to transmit, by means of said basic function, positional data of an agent requiring said agent to be moved away from a user object when said positional data of said user object is found to indicate a position at a distance from said agent within a predetermined range.

* * * * *